(12) United States Patent
Mack et al.

(10) Patent No.: US 8,870,698 B2
(45) Date of Patent: Oct. 28, 2014

(54) ELECTRIC DRIVE UNIT WITH MODULAR MOTOR ASSEMBLY

(71) Applicant: Magna Powertrain of America, Inc., Troy, MI (US)

(72) Inventors: Noel R. Mack, Rochester, MI (US); Harminder Mann, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 13/935,805

(22) Filed: Jul. 5, 2013

(65) Prior Publication Data

US 2013/0296094 A1 Nov. 7, 2013

Related U.S. Application Data

(63) Continuation of application No. 12/899,710, filed on Oct. 7, 2010, now Pat. No. 8,479,851.

(60) Provisional application No. 61/255,124, filed on Oct. 27, 2009.

(51) Int. Cl.
| | |
|---|---|
| *F16H 48/30* | (2012.01) |
| *F16H 37/08* | (2006.01) |
| *H02K 7/00* | (2006.01) |
| *H02K 7/116* | (2006.01) |
| *B60K 1/00* | (2006.01) |

(52) U.S. Cl.
CPC .............. *F16H 37/082* (2013.01); *H02K 7/003* (2013.01); *H02K 7/116* (2013.01); *B60K 1/00* (2013.01); *B60K 2001/001* (2013.01)
USPC ........................................................ 475/150

(58) Field of Classification Search
USPC .............. 180/65.1, 65.23, 65.235, 65.6, 65.7, 180/344; 475/150, 149, 5, 330, 220, 225, 475/248, 275, 1, 206, 207; 477/2, 3; 74/606 R, 607
See application file for complete search history.

(56) References Cited

U.S. PATENT DOCUMENTS

| | | | | |
|---|---|---|---|---|
| 6,059,684 | A * | 5/2000 | Sasaki et al. ................... | 475/206 |
| 6,864,607 | B2 * | 3/2005 | Hashimoto ................. | 310/75 R |
| 8,430,190 | B2 * | 4/2013 | Honda et al. ............... | 180/65.25 |
| 2005/0006967 | A1 * | 1/2005 | Bologna ......................... | 310/83 |
| 2010/0320849 | A1 * | 12/2010 | Wilton et al. ................... | 310/52 |

* cited by examiner

*Primary Examiner* — Saul Rodriguez
*Assistant Examiner* — David J Hlavka
(74) *Attorney, Agent, or Firm* — Dickinson Wright (57) ABSTRACT

An electric drive module for a motor vehicle includes an electric motor assembly having a cartridge housing containing a stator, a rotor, and a rotor shaft. The rotor shaft is supported by the cartridge housing. The electric motor assembly is positioned within an axle housing. A reduction unit includes an input member being driven by the rotor shaft and includes an output member driven at a reduced speed relative to the input member. A differential assembly includes an input driven by the output member, a first differential output driving a first output shaft, and a second differential output driving a second output shaft.

18 Claims, 7 Drawing Sheets

ELECTRIC DRIVE UNIT WITH MODULAR MOTOR ASSEMBLY

CROSS-REFERENCE TO RELATED APPLICATIONS

This application is a continuation of application Ser. No. 12/899,710 filed Oct. 7, 2010 (now U.S. Pat. No. 8,479,851) which claims the benefit of U.S. Provisional Application No. 61/255,124, filed on Oct. 27, 2009. The entire disclosure of the above application is incorporated herein by reference.

FIELD

The present disclosure relates to electric drive systems for motor vehicles. More specifically, the present disclosure relates to a two-speed electric drive module for electric and hybrid vehicles.

BACKGROUND

Automobile manufacturers are actively working to develop alternative powertrain systems in an effort to reduce the level of pollutants exhausted into the air by conventional vehicles equipped with internal combustion engines. Significant development has been directed to electric vehicles and fuel cell vehicles. These alternative powertrain systems are still under development. In addition, several different hybrid electric vehicles have recently been offered for sale. Many of the hybrid vehicles are equipped with an internal combustion engine and an electric motor that can be operated independently or in combination to drive the vehicle.

There are two typical types of hybrid vehicles, namely, series-hybrid and parallel-hybrid. In a series-hybrid vehicle, power is delivered to the wheels by the electric motor which draws electrical energy from the battery. The engine is used in series-hybrid vehicles to drive a generator which supplies power directly to the electric motor or charges the battery when the state of charge falls below a predetermined value. In parallel-hybrid vehicles, the electric motor and the engine can be operated independently or in combination pursuant to the running conditions of the vehicle. Typically, the control strategy for such parallel-hybrid vehicles utilizes a low-load mode where only the electric motor is used to drive the vehicle, a high-load mode where only the engine is used to drive the vehicle, and an intermediate-assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel-hybrid powertrain to drive the primary wheels and a second electric motor to drive the secondary wheels. Obviously, such a four-wheel drive system is extremely expensive and difficult to package. Thus, a need exists to develop solely electrically powered or hybrid powertrains for use in four-wheel drive vehicles that utilize many conventional powertrain components so as to minimize specialized packaging and reduce cost.

SUMMARY OF THE INVENTION

An electric drive module for a motor vehicle includes an electric motor assembly having a cartridge housing containing a stator, a rotor, and a rotor shaft. The rotor shaft is supported by the cartridge housing. The electric motor assembly is positioned within an axle housing. A reduction unit includes an input member being driven by the rotor shaft and includes an output member driven at a reduced speed relative to the input member. A differential assembly includes an input driven by the output member, a first differential output driving a first output shaft, and a second differential output driving a second output shaft.

A method of assembling electric drive modules for motor vehicles having different track widths includes positioning an electric motor assembly within an axle housing. A reduction unit is positioned within the axle housing and includes an input member driven by the electric motor assembly rotor shaft and has an output member driven at a reduced speed relative to the input member. A differential assembly is positioned within the axle housing and includes an input driven by the output member, a first differential output driving a first output shaft, and a second differential output driving a second output shaft. One of a plurality of covers having different axial dimensions is selected based on a vehicle track width. The second output shaft is extended through an aperture in the cover. The cover is coupled to the axle housing.

An electric module for a motor vehicle includes an axle housing including a removable cover fixed to a body. An electric motor assembly including a stator, a rotor and a rotor shaft is positioned within the axle housing. A reduction unit includes an input member being driven by the rotor shaft and having an output member being driven at a reduced speed relative to the input member. A differential assembly includes an input driven by the output member, a first differential output driving a first output shaft, and a second differential output driving a second output shaft. The first output shaft, the second output shaft and the rotor are coaxially arranged. A resolver is operable to output a signal indicative of the speed of the rotor shaft. The resolver includes a resolver stator stationarily coupled to the axle housing body and the resolver rotor fixed for rotation with the rotor shaft. Removal of the cover does not disturb the resolver.

Further areas of applicability of the present disclosure will become apparent from the detailed description provided hereinafter. However, it should be understood that the detailed description and specific examples, while indicating preferred embodiments of the present disclosure, are intended for purposes of illustration only since various changes and modifications within the fair scope of this particular disclosure will become apparent to those skilled in the art.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is related to an electric drive module assembly including an electric motor. More particularly, the electric drive module is controlled for delivering motive power (i.e., drive torque) to a pair of ground-engaging wheels. The compact arrangement of the electric motor, a single speed gearbox or an optional two-speed gear box permits the use of the electric drive module in substitution for a conventional axle assembly. As such, conventional rear-wheel drive and front-wheel drive powertrains can be used in combination with the electric drive module so as to establish a hybrid drive system for a four-wheel drive vehicle. Alternatively, the electric drive module may be used in vehicles powered solely by batteries as well. Accordingly, various features and functional characteristics of the electric drive module will be set forth below in a manner permitting those skilled in relevant arts to fully comprehend and appreciate the significant advantages the present disclosure provides.

Figure 1:
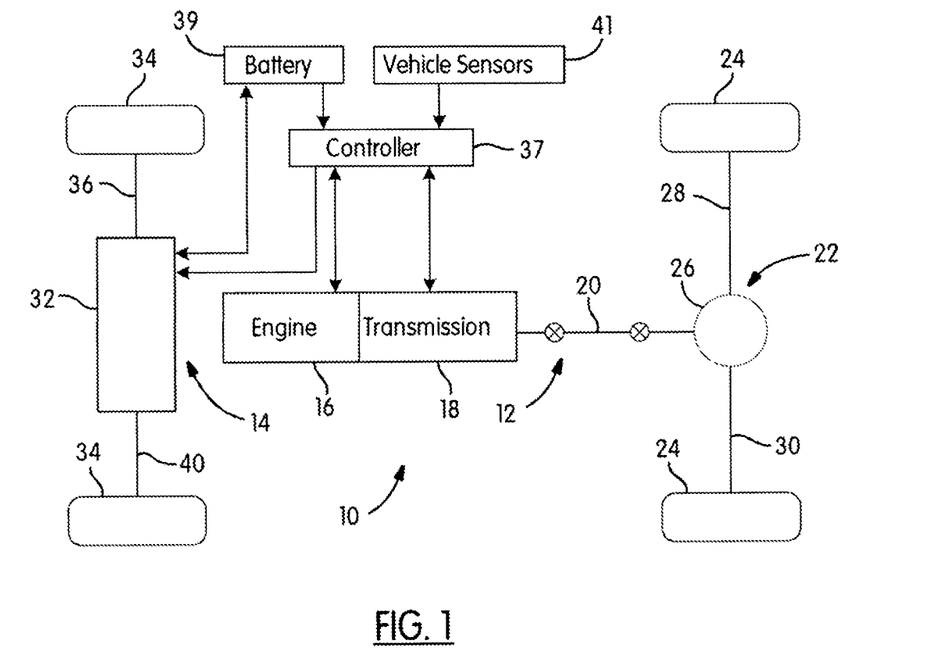
FIG. 1 is a schematic view showing a hybrid powertrain for a four-wheel drive vehicle in accordance with the present disclosure.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axleshafts 28 and 30 to wheels 24. Second powered driveline 14 includes an electric drive module 32 which drives a second pair of wheels 34 through axleshafts 36 and 40.

Figure 2:
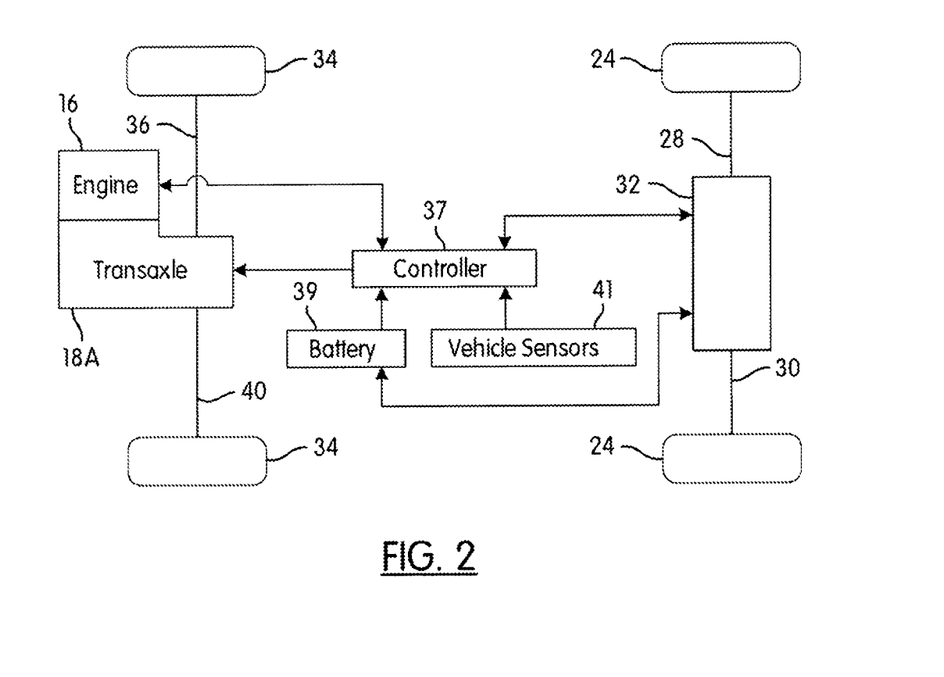
FIG. 2 is a schematic view of an alternative arrangement for the hybrid powertrain of the present disclosure.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that electric drive module 32 supplies power to the rear wheels. To better illustrate this arrangement, FIG. 2 shows electric drive module 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
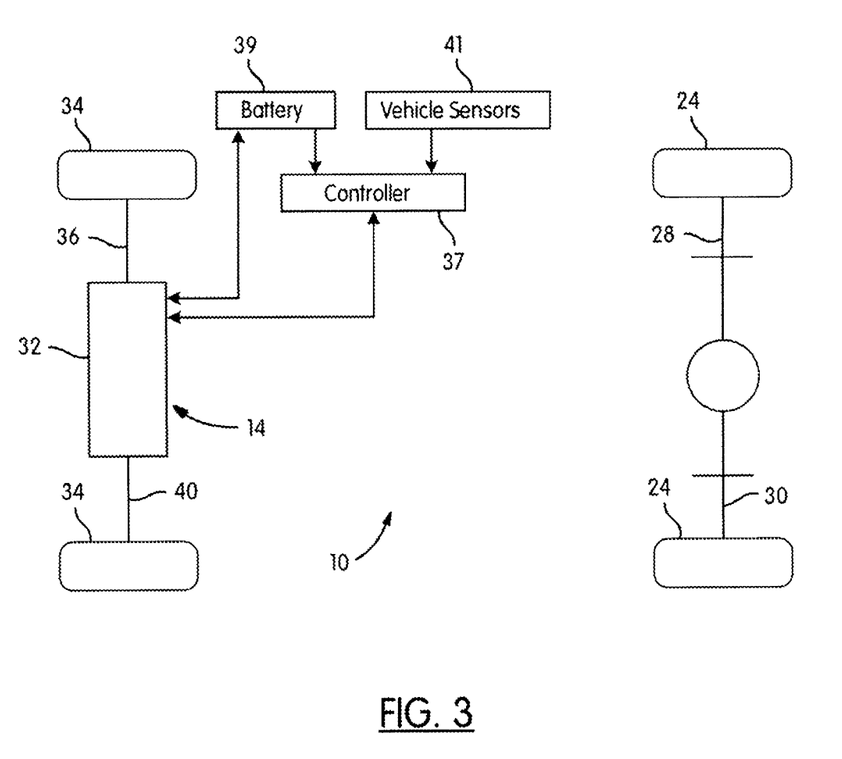
FIG. 3 is a schematic view of an alternative arrangement electric powertrain of the present disclosure.

As shown in FIG. 3, it is also contemplated that electric drive module 32 may be the sole source of motive power for vehicle 10. An internal combustion engine would not be present. Accordingly, front wheels 34 receive torque through axleshafts 36 and 40 provided by electric drive module 32.

FIGS. 1-3 also depict a controller 37 in communication with a battery 39, vehicle sensors 41, electric drive module 32 as well as the engine and transmission, if present. Concurrent control of engine 16, transmission 18 and electric drive module 32 is described in issued U.S. Pat. Nos. 6,595,308 and 6,604,591, which are herein incorporated by reference.

Figure 4:
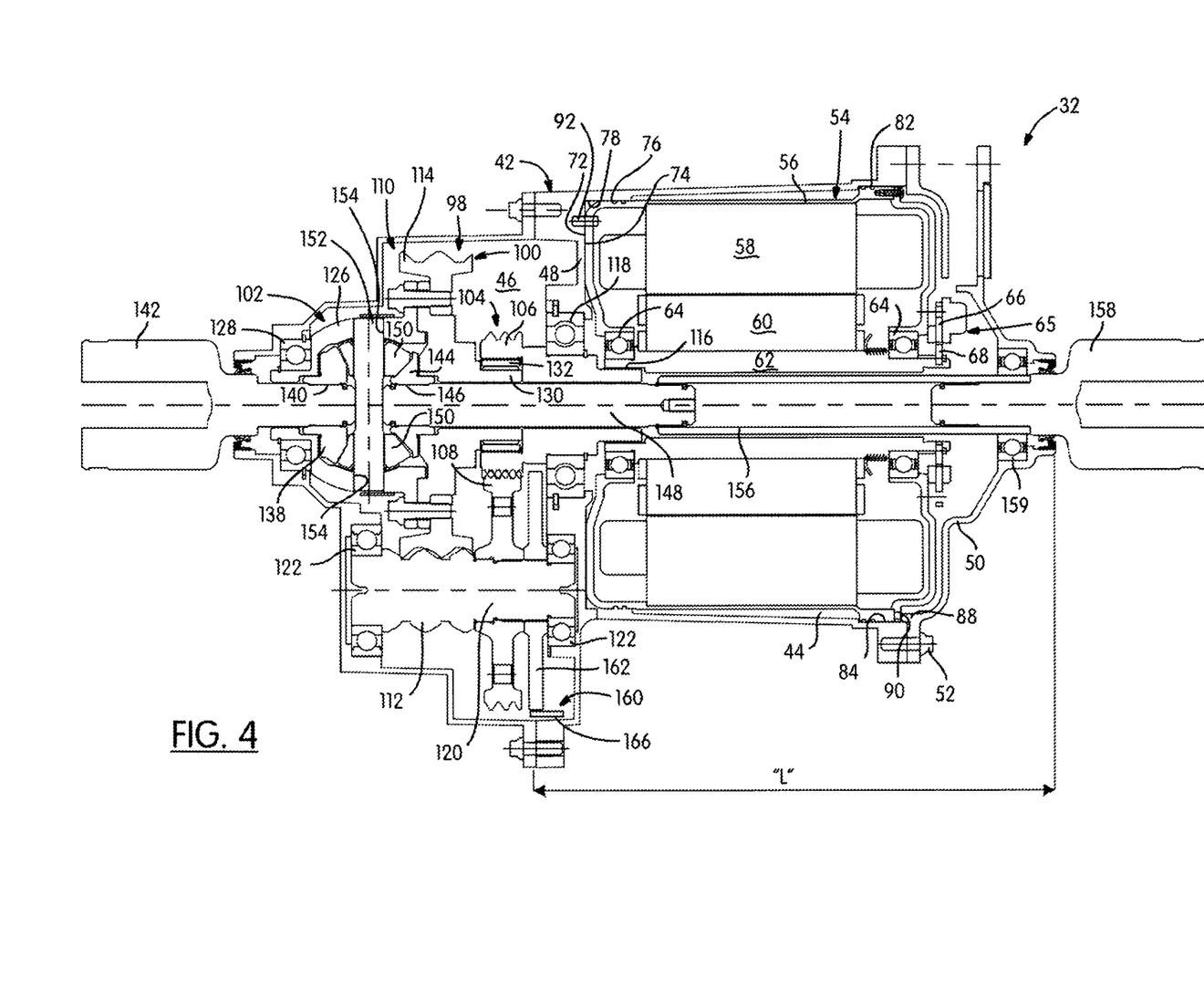
FIG. 4 is a sectional view of an electric drive module associated with the powertrains of FIGS. 1-3.

Referring now to FIG. 4, electric drive module 32 will be described in detail. Electric drive module 32 may be configured as a single speed or multi-speed power transmission device. Furthermore, the axis of electric motor rotor rotation may be co-axial with or offset from an axis of output shaft rotation from electric drive module 32. A co-axial single speed version is depicted in FIG. 4.

Electric drive module 32 includes a multi-section housing assembly 42 defining a motor chamber 44 and a gearbox chamber 46 separated by a radial support wall 48. A cover 50 is fixed to housing assembly 42 via fasteners 52. An electric variable speed motor assembly 54 is located within motor chamber 44. Motor assembly 54 includes a cartridge housing 56, a wound stator 58 secured to cartridge housing 56, a rotor 60 and a rotor shaft 62 fixed for rotation with the rotor 60. Rotor shaft 62 is supported for rotation at its opposite ends by bearing assemblies 64 mounted to cartridge housing 56. In this manner, the relative positioning between stator 58 and rotor 60 may be accurately maintained throughout the operational life of electric drive module 32. Further benefits arise from bearings 64 being coupled to common cartridge housing 56. Accurate alignment of rotor shaft 62 and rotor 60 relative to cartridge housing 56 and stator 58 is maintained.

Motor assembly 54 may be assembled and tested at a location remote from the location where electric drive module 32 is assembled. Furthermore, it is contemplated that motor assembly 54 is tested and approved prior to shipment from the off-site location.

Motor assembly 54 also includes a resolver 65 operable to output a signal indicative of the speed and/or position of rotor shaft 62. A resolver stator 66 is fixed to cartridge housing 56. A resolver rotor 68 is fixed for rotation with rotor shaft 62. The relative position of rotor shaft 62, bearings 64 and cartridge housing 56 assure reliable resolver output. Furthermore, the resolver components 66, 68 are protected from the outside environment by cover 50. Removal of cover 50 does not disturb either resolver stator 66 or resolver rotor 68.

Cartridge housing 56 includes a number of design features to assure that motor assembly 54 is accurately positioned within motor chamber 44. For example, cartridge housing 56 includes a bottom face 72 placed in engagement with a land 74 of support wall 48. Additionally, an outer circumferential surface 76 of cartridge housing 56 is placed in a slip-fit engagement with an inner circumferentially shaped wall 78 defining motor chamber 44. At an opposite end of motor assembly 54, cartridge housing 56 includes a flared portion 82 positioned in engagement with a stepped recess 84 formed in housing assembly 42. To further restrain motor assembly 54 from movement relative to housing assembly 42, cover 50 includes a lip 88 positioned in engagement with an end face 90 of cartridge housing 56. Lip 88 imparts a compressive load on cartridge housing 56 to drive bottom face 72 into engagement with land 74. A dowel 92 fixes cartridge housing 56 to housing assembly 42 and restricts relative rotation therebetween. It should be appreciated that dowel 92 may be positioned at the opposite end of cartridge housing 56 and be alternately fixed to cover 50. A gas or liquid coolant may be pumped into motor chamber 44 to cool motor assembly 54.

Electric drive module 32 further includes a gearbox 98 located within gearbox chamber 46 and which is comprised of a reduction unit 100 and a bevel differential 102. Reduction unit 100 includes a first reduction gearset 104 having a first drive gear 106 in constant meshed engagement with a first driven gear 108 as well as a second reduction gearset 110 having a second drive gear 112 in constant meshed engagement with a second driven gear 114. First drive gear 106 is fixed for rotation with rotor shaft 62 via a splined connection 116. A bearing 118 supports first drive gear 106 for rotation at wall 48. First driven gear 108 and second drive gear 112 are fixed for rotation with a countershaft 120 rotatably supported by bearings 122. Second drive gear 112 is shown as being integrally formed with countershaft 120. Second driven gear 114 is fixed to a casing 126 of bevel differential 102. One end of casing 126 is rotatably supported by a bearing 128. The opposite end of casing 126 includes a snout 130 supported by a bearing 132 and a first drive gear 106. Other bearing arrangements are possible.

Bevel differential 102 further includes a first side gear 138 fixed via a spline connection 140 to a first output shaft 142, a second side gear 144 fixed via a spline connection 146 to a transfer shaft 148, and at least one pair of pinions 150 meshed with side gears 138 and 144. Pinions 150 are rotatably supported on a pinion shaft 152 having its opposite ends located in apertures 154 formed in casing 126. A coupling shaft 156 drivingly interconnects a second output shaft 158 with transfer shaft 148. Coupling shaft 156 extends through rotor shaft 62 and is supported for rotation by a bearing 159 mounted within cover 50.

Figure 5:
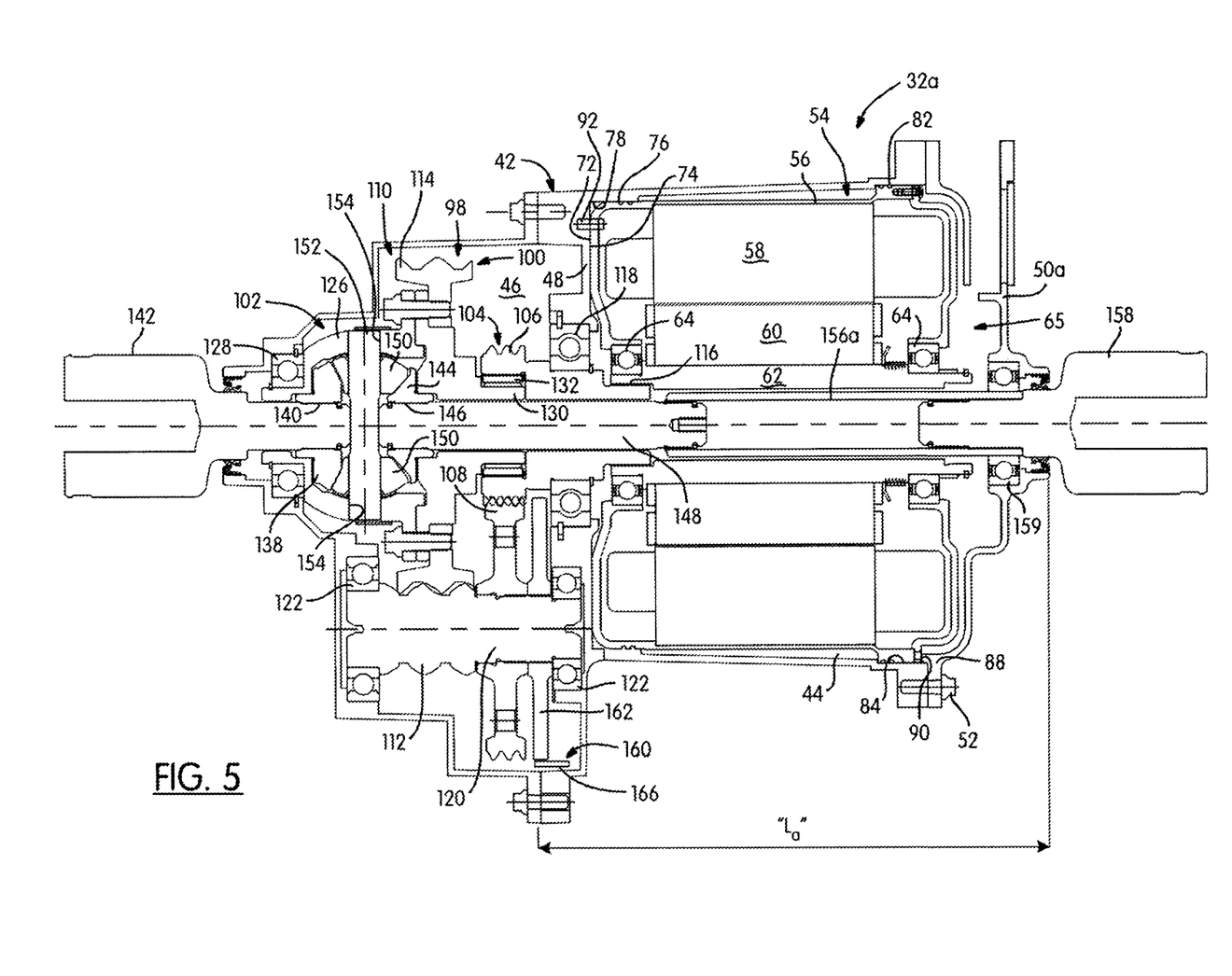
FIG. 5 is a sectional view of an alternate electric drive module configured for use in a vehicle having a different track width.
Figure 6:
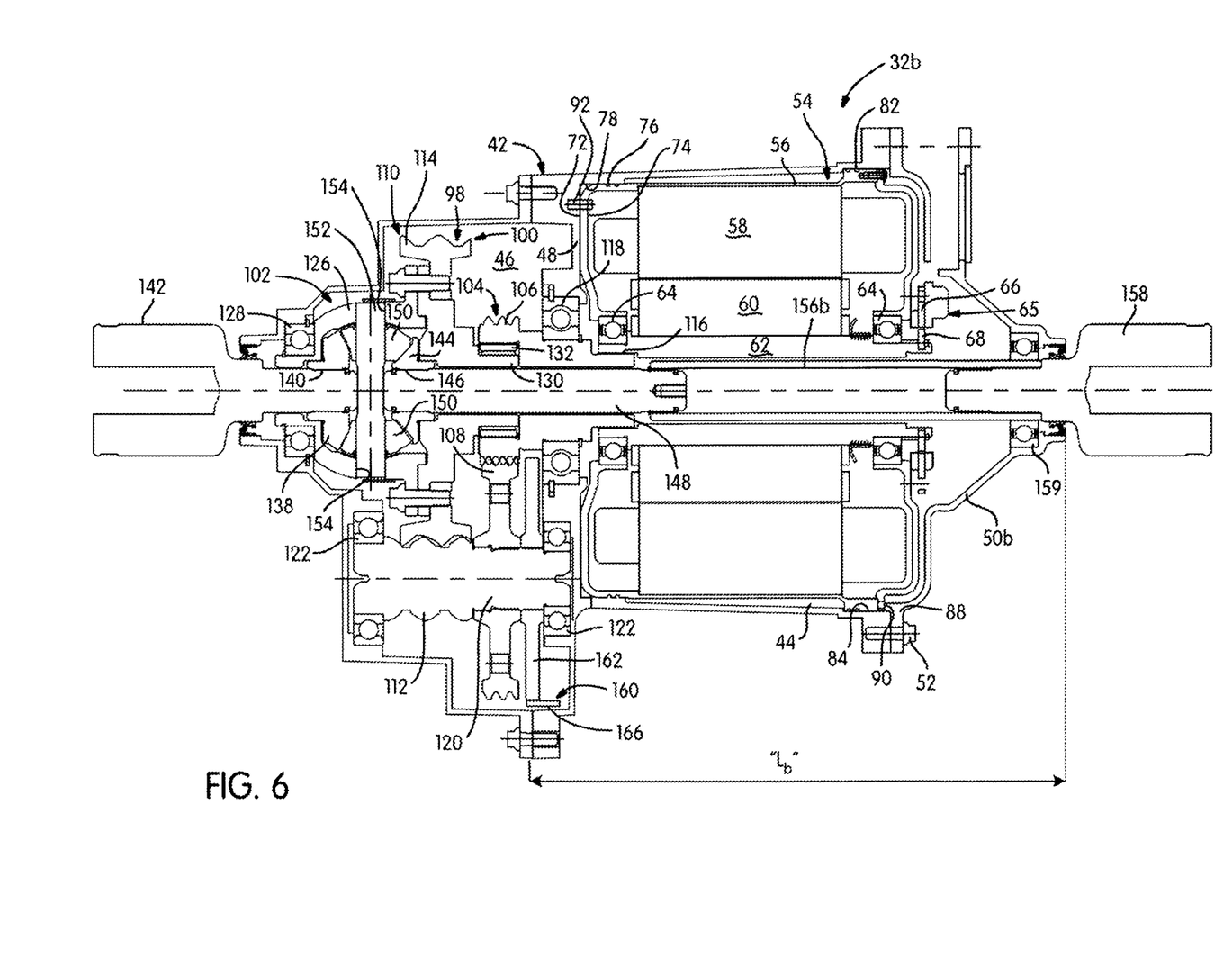
FIG. 6 is a sectional view of another alternate electric drive module configured for use in a vehicle having a different track width.

It should be appreciated that a number of different versions of electric drive module 32 may be constructed to accommodate vehicles having a different track width. Each variation of co-axial electric drive module 32 is designed to include all of the identical components to the other configurations with the exception of cover 50 and coupling shaft 156. FIG. 4 depicts electric drive module 32 including cover 50 defining a dimension "L" from a datum plane at a joint between portions of housing assembly 42 and an extremity of cover 50. FIG. 5 depicts an alternate electric drive module 32a having a cover 50a and a coupling shaft 156a arranged to fit a reduced track width vehicle. Dimension "La" of electric drive module 32a is less than dimension "L" relating to electric drive module 32. In a similar manner, FIG. 6 depicts another electric drive module identified with reference numeral 32b. Electric drive module 32b includes a longer coupling shaft 156b and a cover 50b having an axially extended shape. Dimension "Lb" of electric drive module 32b is longer than dimension "L" of electric drive module 32 shown in FIG. 4. The varying "L" dimensions correspond to varying vehicle track widths. The modular concept described allows for reduced part proliferation, testing and production part approval. A reduced cost family of electric drive modules may be provided.

As shown in FIG. 4, a parking pawl assembly 160 is provided to selectively ground a parking gear 162 fixed for rotation with countershaft 120 to housing assembly 42. Parking gear 162 includes a plurality of teeth selectively engageable with a parking pawl 166. When parking pawl 166 is engaged with parking gear 162, rotation of the components within reduction unit 100 is restricted. Accordingly, movement of vehicle 10 is also restricted.

In accordance with a use of electric drive module 32, output shafts 142 and 158 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. In this manner, electric drive module 32 functions as an electrically-powered secondary axle assembly which can be controlled independently, or in combination with, the engine-based powertrain. To provide a compact arrangement, a portion of transfer shaft 148, coupling shaft 156 and second output shaft 158 extends through tubular rotor shaft 62.

Figure 7:
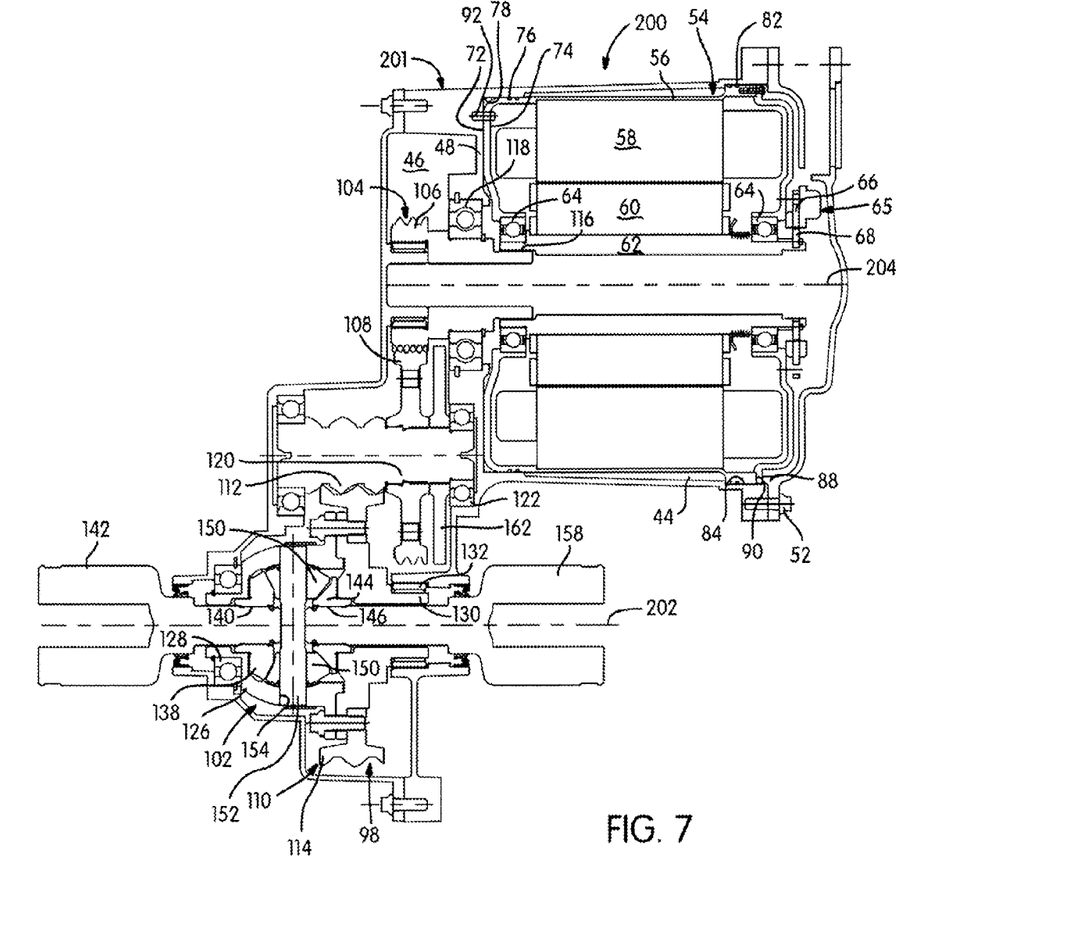
FIG. 7 is a sectional view of another alternate electric drive module having the axes of rotation of the output shafts offset from an axis of rotation of the electric motor rotor.

It should be appreciated that an alternate electric drive module 200 may be configured as an offset power transmission device as shown in FIG. 7. Electric drive module 200 may include many of the components previously described in relation to electric drive module 32. In particular, electric drive module 200 is equipped with motor assembly 54. As previously described, motor assembly 54 is preassembled, tested, certified and approved for use in a number of assemblies including electric drive module 200 without the need for testing the motor assembly in each of the final configurations. Furthermore, it is contemplated that electric drive module 200 may include a new multi-piece housing 201 as well as first output shaft 142 and second output shaft 158. To package electric drive module 200 within a different vehicle, it may be useful to have first output shaft 142 and second output shaft 158 rotate about a first axis 202 while rotor shaft 62 rotates about an axis 204 extending parallel to and offset from axis 202.

Figure 8:
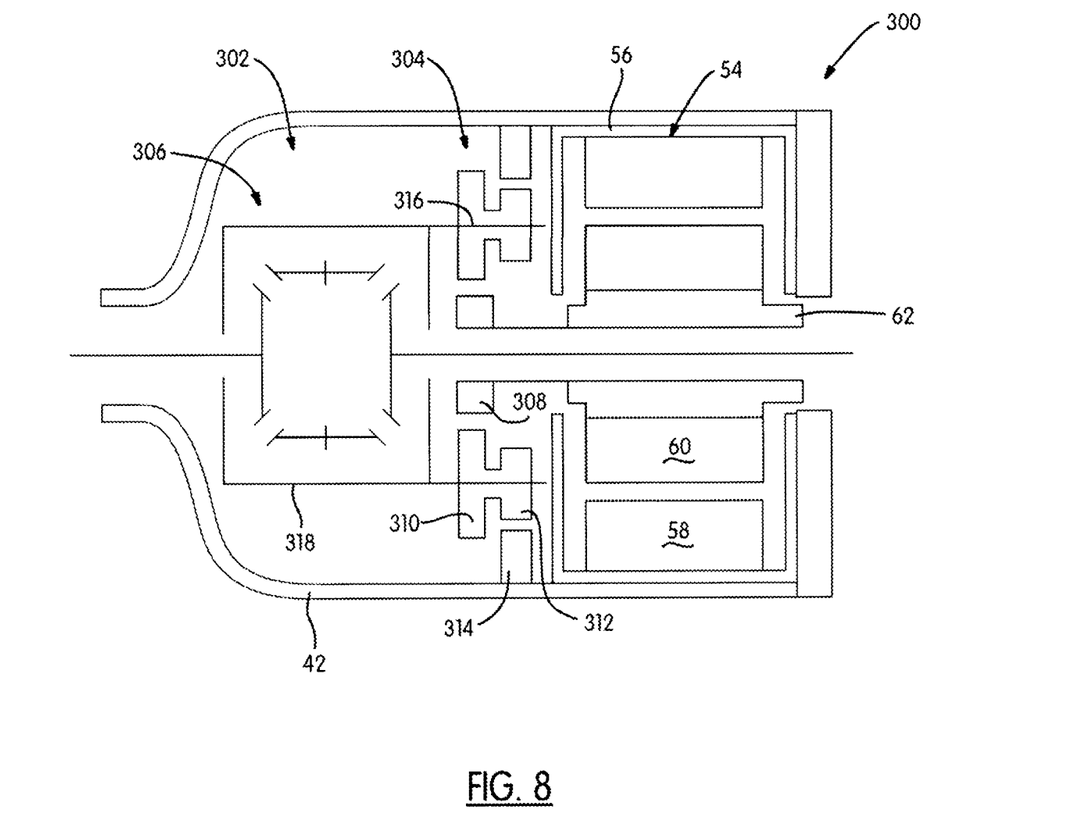
FIG. 8 is a schematic of another alternate electric drive module including a planetary gearset.

FIG. 8 provides a schematic of an alternate electric drive module 300. Electric drive module 300 is substantially similar to electric drive module 32 with the exception that a reduction unit 302 replaces reduction unit 100. Reduction unit 302 includes a planetary gearset 304 and a bevel differential 306. Planetary gearset 304 includes a sun gear 308 driven by rotor shaft 62 of motor assembly 54. A first pinion gear 310 is in constant meshed engagement with sun gear 308. A second reduced diameter pinion gear 312 is in constant meshed engagement with a ring gear 314. Pinion gears 310, 312 are supported for rotation on a carrier 316. Ring gear 314 is fixed to housing assembly 42. Carrier 316 provides the output from planetary gearset 304 and is fixed for rotation with a casing 318 of bevel differential 306. Electric drive module 300 includes the beneficial features previously described in relation to electric drive module 32 such as use of motor assembly 54 having cartridge housing 56, among others. It is contemplated that the countershaft arrangement depicted in FIG. 7 may be replaced with a planetary gearset similar to planetary gearset 304 described and shown in FIG. 8.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module for motor vehicles having different track width dimensions, the electric drive module comprising:
   an axle housing having an axial length dimension and defining a motor chamber and a gearbox chamber that are separated by a radial wall support;
   an electric motor assembly positioned within the motor chamber of the axle housing and including a cartridge housing containing a non-rotary stator and a rotor shaft rotatably supported by the cartridge housing;
   a reduction unit disposed in the gearbox chamber of the axle housing and having an input member driven by the rotor shaft and an output member driven at a reduced speed relative to the input member, the input member extending through a central aperture in the radial wall support of the axle housing into the motor chamber and being coupled for rotation with the rotor shaft;

a differential assembly disposed within the gearbox chamber of the axle housing and having a differential input driven by the output member of the reduction unit, a first differential output driving a first output shaft, and a second differential output driving a second output shaft;

a transfer assembly interconnecting the second differential output to the second output shaft, the transfer assembly including a transfer shaft connected to the second differential output and a coupling shaft selected from a plurality of coupling shafts each having a different axial dimension, the selected coupling shaft connecting the transfer shaft to the second output shaft; and a cover selected from a plurality of covers each having a different axial dimension, the selected cover being attached to the axle housing for enclosing an open end of the motor chamber, at least one of the selected coupling shaft and the second output shaft is rotatably supported by the selected cover, wherein the selected coupling shaft and the selected cover are selected in combination with the axle housing based on the vehicle track width dimension of the motor vehicle.

2. The electric drive module of claim 1 wherein a pair of first and second bearing assemblies are provided for rotatably supporting first and second ends of the rotor shaft from the cartridge housing, wherein a third bearing assembly is provided for rotatably supporting the input member of the reduction unit in the central aperture in the radial wall support of the axle housing, wherein fourth and fifth bearing assemblies rotatably support the differential input between the axle housing and the input member of the reduction unit, and wherein a sixth bearing assembly is provided for rotatably supporting one end of the selected coupling shaft within a central aperture formed in the selected cover.

3. The electric drive module of claim 2 wherein the transfer shaft extends through the input member of the reduction unit into the motor chamber of the axle housing, wherein each of the plurality of coupling shaft is configured to extend through the rotor shaft and has a first end adapted to be fixedly connected to the transfer shaft and a second end adapted to be fixedly connected to the second output shaft.

4. The electric drive module of claim 3 wherein the second end of each of the coupling shafts is adapted to be rotatably supported by the sixth bearing assembly with the central aperture of the selected cover.

5. The electric drive module of claim 1 wherein a first end of the cartridge housing engages the radial wall support of the axle housing, and wherein the selected cover engages a second end of the cartridge housing and is fixedly secured to a flange portion of the axle housing.

6. The electric drive module of claim 1 wherein the reduction unit includes a first gear driven by the input member, a second gear meshed with the first gear and fixed to a countershaft rotatably supported in the gearbox chamber of the axle housing, a third gear driven by the countershaft, and a fourth gear meshed with the third gear and fixed to the differential input, whereby the reduction unit establishes a reduction speed ratio drive connection between the rotor shaft and the differential input.

7. The electric drive module of claim 1 wherein the reduction unit includes a sun gear driven by the rotor shaft, a ring gear fixed to the axle housing within the gearbox chamber, and a plurality of pinion gears rotatable supported by the differential input and meshed with the sun gear and the ring gear.

8. The electric drive module of claim 7 wherein the pinion gears each include a first pinion gear section meshed with the sun gear and a second pinion gear section meshed with the ring gear.

9. An electric drive module for use in a motor vehicle having a track width dimension to drive a pair of wheels, comprising:

an axle housing having an axial dimension, the axle housing defining a gearbox chamber, an open-ended motor chamber, and a support wall therebetween;

a gearbox assembly installed within the gearbox chamber, the gearbox assembly including a differential unit and a reduction unit, the reduction unit including a tubular input member rotatably supported in an aperture extending through the support wall and an output member driven at a reduced speed relative to the input member, the differential unit including a differential input driven by the output member, a first differential output driving a first output shaft adapted to drive one of the wheels, and a second differential output driving a transfer shaft extending through the input number into the motor chamber;

an electric motor assembly installed within the motor chamber, the electric motor assembly including a cartridge housing non-rotatably fixed on the support wall, a stator fixed to the cartridge housing and a rotor shaft rotatably supported by the cartridge housing and fixed for rotation with the input member of the reduction unit;

a coupling shaft having a desired shaft length and coupled for rotation with the transfer shaft, the coupling shaft selected from a plurality of coupling shafts each having a different shaft length;

a cover having a desired cover length and attached to a second output shaft that is adapted to drive the other one of the wheels, the cover selected from a plurality of covers each having a different cover length; and wherein the selected coupling shaft extends through an aperture in the selected cover.

10. The electric drive module of claim 9 wherein the selected coupling shaft extends through the rotor shaft.

11. The electric drive module of claim 10 wherein the second output shaft extends within a tubular portion of the selected coupling shaft.

12. The electric drive module of claim 11 wherein the tubular portion of the selected coupling shaft is rotatably supported by the selected cover.

13. The electric drive module of claim 9 wherein the cartridge housing of the electric motor assembly has a face surface disposed in mating engagement with a wall surface of the support wall.

14. The electric drive module of claim 13 further comprising providing an annular lip on the cartridge housing and engaging the annular lip against a stepped surface of the axle housing.

15. The electric drive module of claim 14 further comprising providing the cover with an axially extending protection and engaging the axially-extending projection against an end face of the cartridge housing.

16. An electric drive module for a motor vehicle having a track with dimension, comprising:

an electric motor assembly positioned within a motor chamber of an axle housing;

a reduction unit positioned within a gearbox chamber of the axle housing, the reduction unit including an input member being driven by the electric motor assembly and an output member being driven at a reduced speed relative to the input member;

a differential assembly positioned with;- the gearbox chamber of the axle housing, the differential assembly including a differential input driven by the output member, a first differential output driving a first output shaft, and a second differential output driving a transfer shaft; and a cover coupled to the axle housing to enclose the motor chamber, the cover selected from a plurality of covers each having a different axial dimension based on the vehicle track width, wherein the transfer shaft extends through an aperture in the cover.

17. The electric drive module of claim 16 further including a coupling shaft coupled to the transfer shaft and a second output shaft, wherein the coupling shaft is selected from a plurality of coupling shafts each having a different axial dimension based on the vehicle track width.

18. The electric drive module of claim 16 wherein a cartridge housing of the electric motor assembly is clamped into engagement with portions of the motor chamber in the axle housing when the selected cover is coupled to the axle housing.

\* \* \* \* \*